United States Patent [19]

Yunoki et al.

[11] Patent Number: 4,642,711
[45] Date of Patent: Feb. 10, 1987

[54] VIDEO TAPE RECORDER INCLUDING VERTICAL RECORDING HEADS

[75] Inventors: Yutaka Yunoki; Kenji Kimura; Akira Kato; Tatsuo Imamura, all of Tokyo, Japan

[73] Assignee: Olympus Optical Co., Ltd., Tokyo, Japan

[21] Appl. No.: 551,323

[22] Filed: Nov. 14, 1983

[30] Foreign Application Priority Data

Nov. 29, 1982 [JP] Japan ................................. 57-209074

[51] Int. Cl.$^4$ ...................... G11B 5/027; G11B 5/127; G11B 5/52; G11B 21/04
[52] U.S. Cl. ......................................... 360/84; 360/64; 360/108; 360/110; 360/125
[58] Field of Search ................... 360/84, 64, 104, 107, 360/108, 125, 110, 113, 122, 62, 85, 24

[56] References Cited

U.S. PATENT DOCUMENTS

| | | | |
|---|---|---|---|
| 2,743,318 | 4/1956 | de Forest . | |
| 2,889,414 | 6/1939 | Gratian et al. . | |
| 3,202,771 | 8/1965 | Wada | 360/84 |
| 3,384,881 | 5/1968 | Frost et al. | 360/125 |
| 3,454,727 | 7/1969 | Siera et al. . | |
| 4,138,702 | 2/1979 | Magnenet | 360/125 |
| 4,253,127 | 2/1981 | Kodama et al. | 360/125 |
| 4,277,809 | 7/1981 | Fisher et al. . | |
| 4,296,430 | 10/1981 | Warren | 360/104 X |
| 4,383,284 | 5/1983 | Isshiki | 360/125 |
| 4,385,334 | 3/1983 | Yanagida | 360/125 |
| 4,441,131 | 4/1984 | Osanai | 360/119 |
| 4,562,503 | 12/1985 | Fujioka et al. | 360/122 X |

FOREIGN PATENT DOCUMENTS

| | | |
|---|---|---|
| 0033236 | 8/1981 | European Pat. Off. . |
| 0053944 | 6/1982 | European Pat. Off. . |
| 3120549 | 11/1982 | Fed. Rep. of Germany . |
| 43-68 | 1/1968 | Japan .................................... 360/84 |
| 55-70932 | 5/1980 | Japan . |
| 55-160324 | 12/1980 | Japan .................................... 360/110 |
| 56-11612 | 2/1981 | Japan .................................... 360/122 |
| 56-169218 | 12/1981 | Japan .................................... 360/84 |
| 56-169212 | 12/1981 | Japan . |
| 57-20908 | 2/1982 | Japan . |
| 58-19715 | 2/1983 | Japan .................................... 360/110 |
| 58-164002 | 9/1984 | Japan . |
| 497800 | 12/1938 | United Kingdom . |
| 1017223 | 1/1966 | United Kingdom . |
| 1239918 | 7/1971 | United Kingdom . |
| 1321940 | 7/1973 | United Kingdom . |

OTHER PUBLICATIONS

Patents Abstracts of Japan, vol. 7, No. 164 (P-211) 1309, Jul. 19th, 1983 (JP-A-58-70414).
"Electronics"—pp. 131-135, Sep. 22, 1982.

Primary Examiner—Stuart N. Hecker
Assistant Examiner—Benjamin E. Urcia
Attorney, Agent, or Firm—Frishauf, Holtz, Goodman & Woodward

[57] ABSTRACT

A helical scanning type video tape recorder includes a rotary cylinder which is slidable on a video tape; and a pair of vertical magnetization recording heads mounted on the peripheral wall of the rotary cylinder at prescribed positions. The plane of the vertical magnetization recording heads which faces the magnetic plane of the video tape is provided with a main magnetic pole and auxiliary magnetic pole, thereby causing at least one portion of the recording magnetic flux passing from the auxiliary magnetic pole to the main magnetic pole to penetrate the recording magnetic layer of the video tape at substantially right angles.

16 Claims, 18 Drawing Figures

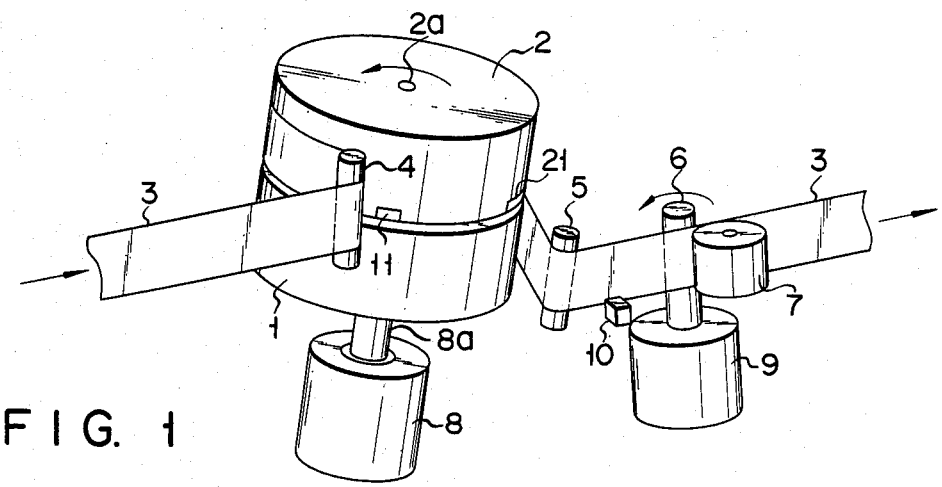
F I G. 1
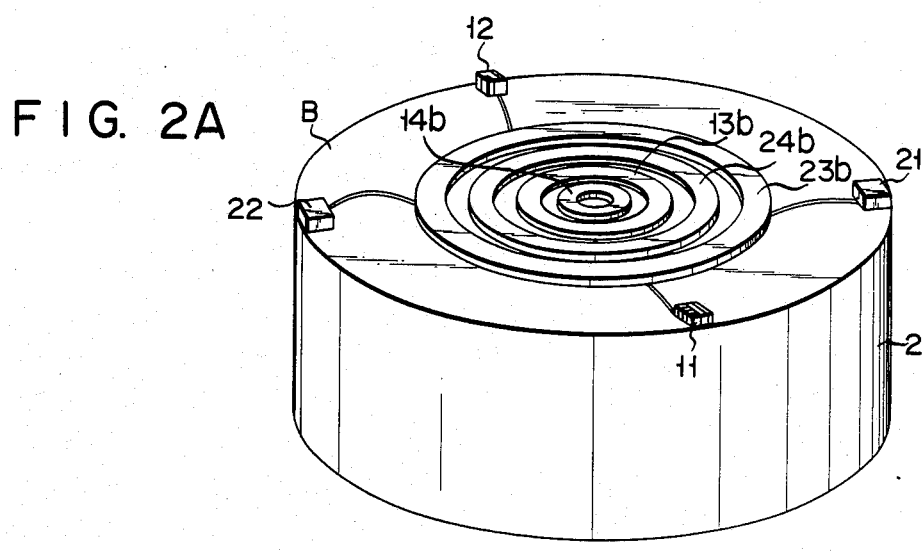
F I G. 2A
F I G. 2B
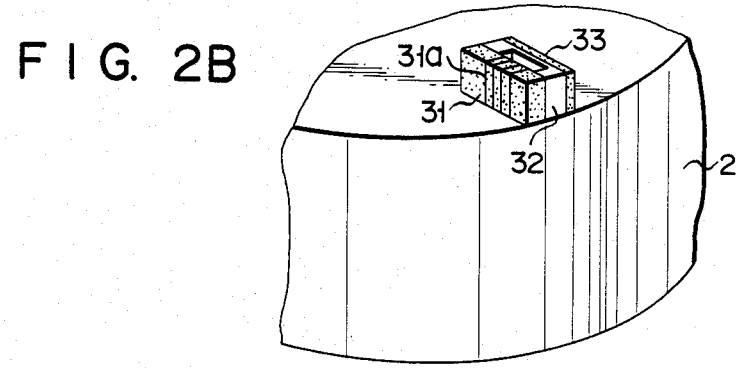

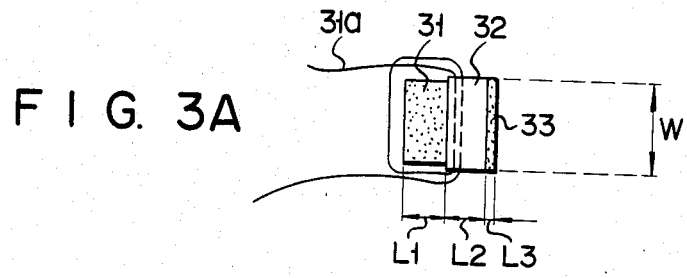
FIG. 3A
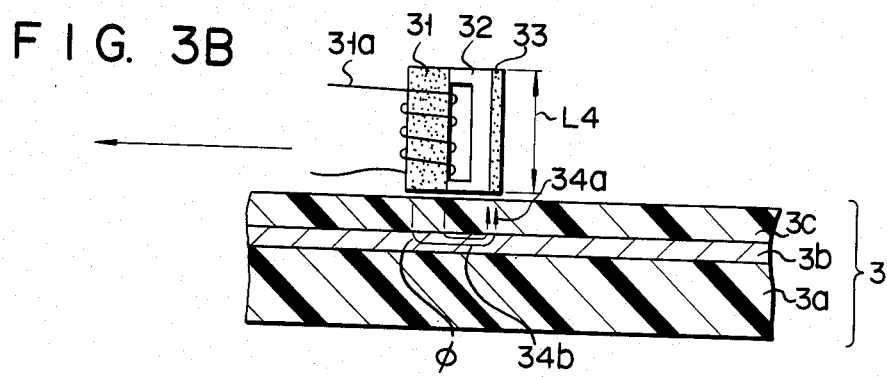
FIG. 3B
FIG. 3C
FIG. 4
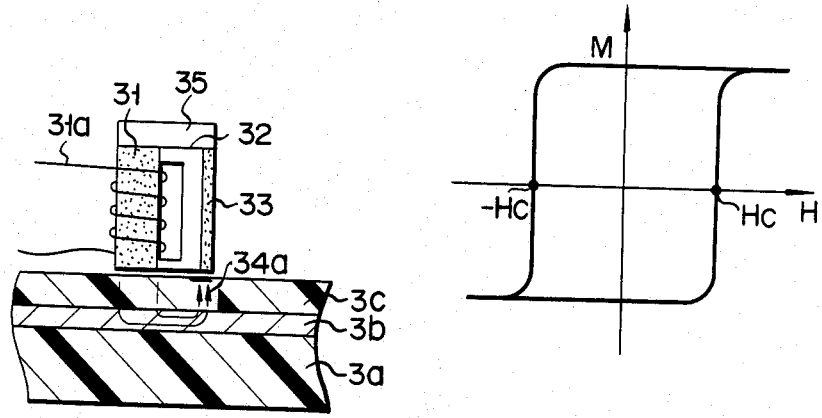

F I G. 9A
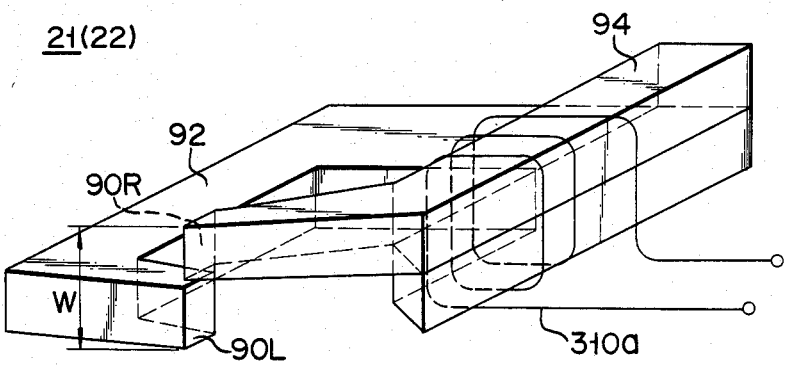
F I G. 9B
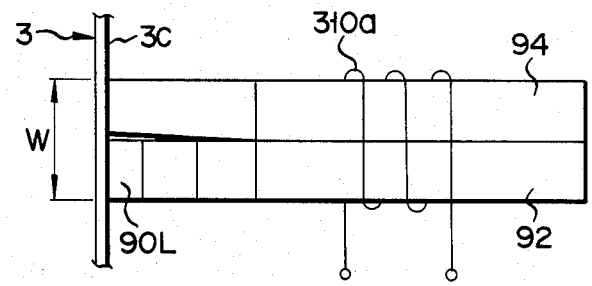
F I G. 9C
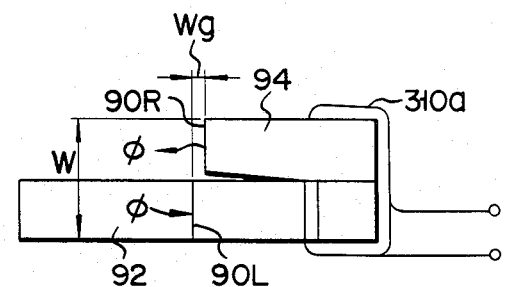

F I G. 10A
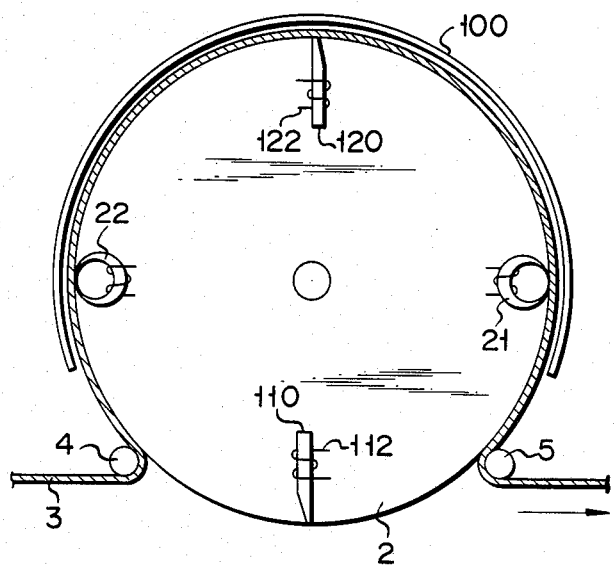
F I G. 10B
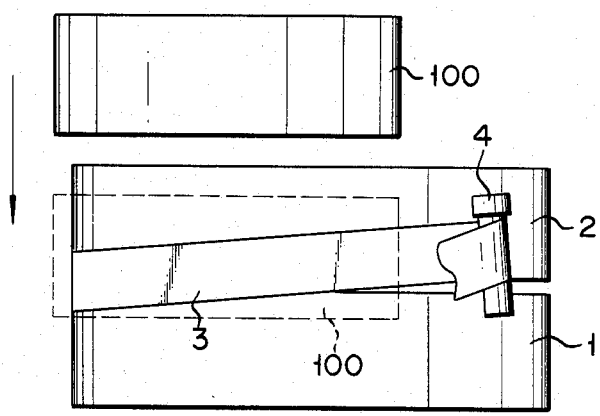

VIDEO TAPE RECORDER INCLUDING VERTICAL RECORDING HEADS

BACKGROUND OF THE INVENTION

This invention relates to a helical scanning type video tape recorder (hereinafter abbreviated as a "VTR") for recording, e.g., a video signal on a magnetic tape provided with a perpendicular or vertical magnetization layer, and for reproducing a video signal from the magnetic tape; and, more particularly, relates to a configuration of a rotary head mechanism for use in recording a video signal on the perpendicular magnetization layer and reproducing a video signal from the perpendicular magnetization layer.

Recent improvements in magnetic tapes (video tapes) and magnetic heads have assured high density recording. Therefore, it has been made possible to record data continuously for six to eight hours, via the present VTR system, which is represented by the VHS format or $\beta$ format. Further, for higher density recording, the so-called vertical (or perpendicular) magnetization recording system has been proposed, in which a magnetic tape provided with a perpendicular magnetization layer is used as a recording medium, in place of the conventional VTR using a magnetic tape provided with a planar magnetization layer. However, difficulties have been encountered in applying said so-called vertical magnetization recording system to a rotary head type VTR based on, e.g., the helical scanning process. With the perpendicular magnetization recording, it is generally necessary to set a video tape between a main magnetic pole and an auxiliary magnetic pole. Particularly with the helical scanning type VTR, it is considered necessary to rotate both the main and auxiliary magnetic poles. However, difficulties have been experienced in devising a mechanism adapted to rotate the main and auxiliary magnetic poles under a condition wherein a magnetic tape helically wound on a cylinder is interposed between both magnetic poles.

SUMMARY OF THE INVENTION

Accordingly, the primary object of the present invention is to provide a VTR equipped with a rotary head mechanism adapted to effect recording/playback by means of the perpendicular or vertical magnetization recording system.

To achieve the above object, an embodiment of the invention includes a rotary cylinder in which main and auxiliary magnetic poles are provided. These magnetic poles are jointly rotated with the rotation of said cylinder. In such a configuration, for instance, a magnetic flux ($\phi$) released from the auxiliary magnetic pole (31) almost perpendicularly penetrates, in the vicinity of the main magnetic pole (31), a perpendicular magnetization layer (3c) of a video tape (3) when the magnetic flux ($\phi$) is absorbed into the main magnetic pole (31), thereby effecting perpendicular magnetization recording (FIG. 3B). The configuration in which the main and auxiliary magnetic poles (31, 33) are provided in the rotary cylinder (2) eliminates the necessity of providing an auxiliary magnetic pole which rotates around the outside of the cylinder so that the video tape (3) is interposed between the outer rotating auxiliary pole and the rotating cylinder. Therefore, this invention enables a rotary head mechanism to be easily manufactured from substantially the same parts as the conventional planar recording type rotary head.

A rotary head mechanism according to another embodiment of this invention comprises a non-rotatable magnetic wall (auxiliary magnetic pole) surrounding a rotary cylinder, and a main magnetic pole fitted to the rotary cylinder in a state in which it is rotatable inside the magnetic wall. In this case, the video tape (3) travels in a state in which it is interposed between the magnetic wall (100) and rotary cylinder (2) (FIG. 10A) Magnetic fluxes released from the main magnetic poles (110, 120) perpendicularly penetrate the magnetic layer of the video tape (3), to be absorbed by the magnetic wall (100). Since, in this case, the magnetic wall (100) acting as an auxiliary magnetic pole need not be rotated, a rotary head can be manufactured from substantially the same parts as the conventional planar recording type rotary head.

BRIEF DESCRIPTION OF THE DRAWINGS

FIG. 1 is a schematic oblique view showing the surroundings of the rotary head of the VTR;

FIG. 2A is an oblique view showing perpendicular magnetization recording and playback heads mounted on a rotary cylinder, and secondary coils of rotary transformers connected to the recording and playback heads;

FIG. 2B is a fractional enlarged view of one of the perpendicular magnetization recording heads shown in FIG. 2A;

FIG. 3A is a front view taken from that side of the VTR on which the head of FIG. 2B is made to sldie along the surface of the video tape;

FIG. 3B is a top view showing the head of FIG. 3A in contact with the video tape;

FIG. 3C illustrates a modification of the head indicated in FIG. 3B;

FIG. 4 shows the magnetization curves of that uppermost layer 3c of the video tape which is set forth in FIG. 3B and has a perpendicular magnetic anisotropy;

FIGS. 9A to 9C jointly show the arrangement of a playback head adapted for the playback of data recorded on a video tape by a perpendicular magnetization recording system, FIG. 9A being an oblique view, FIG. 9B being a side view, and FIG. 9C being a front view;

FIG. 10A is a plan view showing the arrangement of the surroundings of the rotary cylinder, when the main magnetic poles of the perpendicular magnetization recording heads are fitted to a rotary cylinder, and a non-rotatable magnetic wall surrounding the rotary cylinder is used as an auxiliary magnetic pole; and FIG. 10B is a side view of the surroundings of the rotary cylinder of FIG. 10A, which shows that, after the video tape 3 is wound about the cylinder 2, the magnetic wall 100 is shifted to a broken line position, causing to video tape 3 to be interposed between the magnetic wall 100 and main magnetic pole 120 (or 110).

DETAILED DESCRIPTION OF THE PREFERRED EMBODIMENTS

Figure 5:
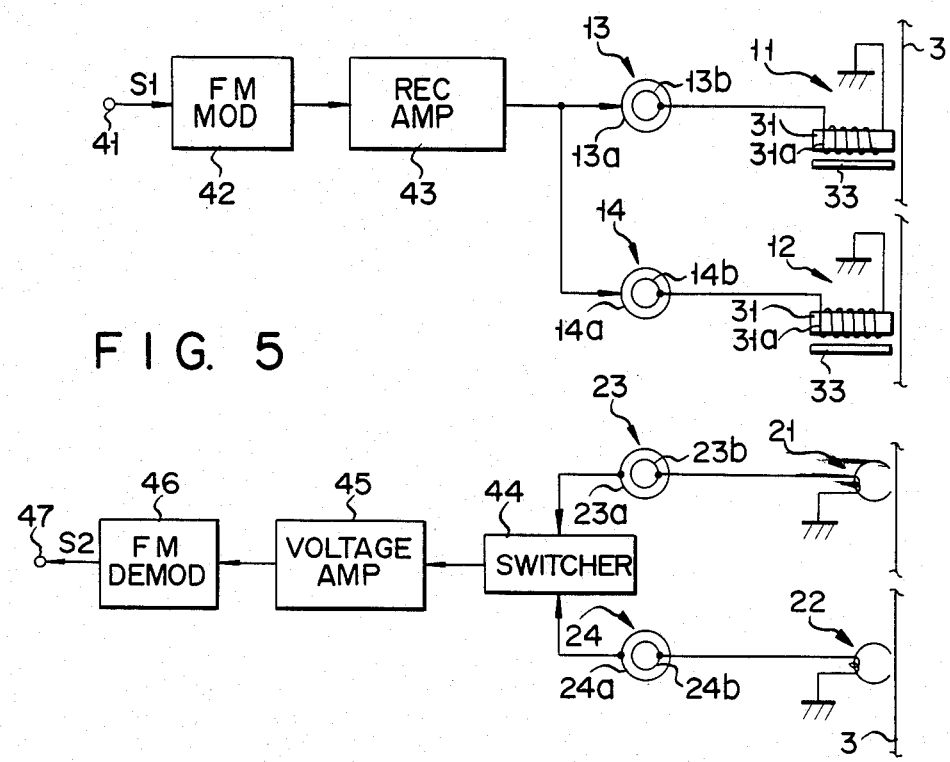
FIG. 5 shows a recording-playback electrical circuit configuration connected to the rotary heads of FIG. 2A.

A description may now be made, with reference to the accompanying drawing, of the video tape recorder embodying this invention, FIG. 1 is an oblique view showing the surroundings of the rotary head of the helical scanning type VTR embodying the invention. The VTR of this invention is operated according to the same principles as the conventional VHS or β type VTR. FIG. 1 shows a stationary cylinder 1, a rotary cylinder 2, and a video tape 3 provided with a perpendicular magnetization layer. The video tape 3 is conducted through a space defined between a capstan 6 and pinch roller 7, while being guided by guide posts 4, 5. The shaft 2a of the rotary cylinder 2 is connected to the rotary shaft 8a of a motor 8 which rotates the cylinder 2 counterclockwise, in the direction of the arrow shown in FIG. 1. The capstan 6, whose shaft is connected to that of a capstan motor 9, is rotated counterclockwise in the direction of the indicated arrow. The video tape 3 travels in the direction of the indicated arrow, in a state wherein it is pressed against the capstan 6 by the pinch roller 7. Also shown is a tracking control head 10, a below-mentioned vertical recording head 11 and a corresponding playback head 21.

FIGS. 2A and 2B are oblique views showing vertical recording heads 11, 12 and a playback head 21 mounted on the underside B of the rotary cylinder 2 which faces the upper surface of the stationary cylinder 1. As may be seen from FIG. 2A, the vertical recording heads 11, 12 are provided on the surface B of the rotary cylinder 2, in a symmetrical relationship with respect to the rotary shaft of said cylinder 2 and at an angle of 180°. An imaginary line extending between the recording heads 11, 12 and an imaginary line extending between the playback heads 21, 22 perpendicularly intersect each other. The recording heads 11, 12 and playback heads 21, 22 may be fitted to the cylinder 2 by means of, e.g., screws or an adhesive. The front end of each head is so positioned that, when the rotary cylinder 2 turns, said front end slides across the magnetic plane of the video tape 3, to thereby effect recording or a playback. The windings of the recording heads 11, 12 are respectively connected to the secondary windings 13b, 14b of rotary transformers 13 and 14 (to be described later). The windings of the playback heads 21, 22 are respectively connected to the secondary windings 23b, 24b of rotary transformers 23 and 24 (to be described later). The primary windings of the rotary transformers 13, 14, 23, 24 are fixed on that plane of the stationary cylinder 1 which faces the plane B of the rotary cylinder 2, in a state wherein they very closely face the secondary windings 13b, 14b, 23b, 24b of the rotary transformers 13, 14, 23, 24. The rotary transformers 13, 14, 23, 24 used with the video tape recorder embodying this invention may be comprised of those which are applied to the conventional VHS and β type VTRs. The playback heads 21, 22 used with the video tape recorder embodying this invention are comprised of ring heads having a ring-shaped magnetic circuit. As indicated in the enlargement of FIG. 2B, the vertical recording heads 11, 12 respectively comprise: an auxiliary magnetic pole 31 which is prepared from, e.g., a ferromagnetic ferrite and wound with a winding 31a; a spacer 32 formed of, e.g., a non-magnetic ceramic material; and a main magnetic pole 33 consisting of, e.g., a super permalloy foil.

FIGS. 3A and 3B indicate the arrangement of the vertical magnetization recording heads 11, 12, along with that of a double-layered video tape 3. As may be seen from FIG. 3B, the video tape 3 is constructed by depositing a perpendicular magnetization layer 3c, which is prepared from a ferromagnetic perpendicular anisotropic material, on the side of a tape base 3a comprised of, e.g., Mylar (polyester) film, with a high permeability magnetic layer 3b interposed therebetween. This magnetic layer 3b can be produced by the conventional method of manufacturing a video tape. Orientation is applied to a plane parallel to the plane of the base 3a, to produce an axis of easy magnetization. The magnetic layer 3c having an axis of easy magnetization extending in a direction perpendicular to the plane of the base 3a is formed by the vacuum thermal deposition of a thin layer of amorphous godolinium-cobalt alloy (see U.S. Pat. No. 4,179,719, issued on Dec. 18, 1979).

Referring to FIGS. 3A and 3B, an auxiliary magnetic pole 31 is prepared from a high permeability magnetic material, such as Sendust or a hot-press ferrite, in the form of a parallelepiped. This auxiliary magnetic pole 31 is fitted with a spacer 32 prepared from a hard non-magnetic material, such as glass or a ceramic material with a substantial width W (FIG. 3A). This width W corresponds to that of a recording track on a video tape, and measures, e.g., 100 microns.

A main magnetic pole 33 is prepared from a thin layer of a high permeability magnetic material deposited on the spacer 32 by, e.g., sputtering or thermal deposition, with a given thickness of about 1 micron. The above-mentioned elements 31, 32, 33 jointly constitute a vertical recording head 11 or 12. This recording head slides to the left, in the direction of the arrow indicated in FIG. 3B, to perpendicularly magnetize the recording layer 3c. In this case, it is to be noted that, if the perpendicular recording head 11 or 12 happens to slide to the right, along the tape 3, in a direction opposite to that of the arrow indicated in FIG. 3B, problems will arise. Referring to FIGS. 3A and 3B, The thickness L1 of the auxiliary magnetic pole 31, the thickness L2 of the spacer 32, the thickness L3 of the main magnetic pole 33 and the length L4 of the main and auxiliary magnetic poles 33, 31 should preferably be within the following ranges:

L1 about 100 $\mu$m to about 1,000 $\mu$m
L2 about 10 $\mu$m to about 1,000 $\mu$m
L3 about 0.1 $\mu$m to about 1 $\mu$m
L4 about 1 mm to about 10 mm As may be seen from FIG. 3B, the main stream of a magnetic flux $\phi$ released from the auxiliary magnetic pole 31 having a given width L1 flows through the high permeability magnetic layer 3b and is collected in front of the main magnetic pole 33. This collected flux stream perpendicularly penetrates the recording layer 3c, and is absorbed by the main magnetic pole 33. Further, as shown in FIG. 3c, it is possible to magnetically short-circuit the backsides of the main and auxiliary magnetic poles 33, 31 by means of a ferromagnetic material 35. That side of the main and auxiliary magnetic poles 33, 31 and spacer 32 which slides along the tape 3 is finely polished in advance, to facilitate said sliding.

The symbol φ in FIG. 3B indicates the route along which a magnetic flux flows from the auxiliary magnetic pole 31 to the main magnetic pole 33. FIG. 3B also shows that component of 34a the magnetic flux which perpendicularly penetrates the recording layer 3c, and that component 34b of the magnetic flux which runs lengthwise through the high permeability magnetic layer 3b.

FIG. 4 shows the hysteresis characteristic of the perpendicular magnetization recording layer 3c. As may be seen from FIG. 4, this perpendicular magnetization recording layer 3c has a rectangular hysteresis characteristic. When supplied with a magnetic field H stronger than the field Hc of inverted magnetism (coercive force), the perpendicular magnetization recording layer 3c then has the polarity of its magnetization M suddenly inverted, thereby allowing for the recording of a signal.

FIG. 5 is a block circuit diagram of the electrical arrangement of the video tape recorder embodying this invention. Reference is first made to the recording in a VTR. A video signal S1 supplied to an input terminal 41 for recording is conducted to an FM modulator 42. With the embodiment of the invention, the selected center frequency of the FM modulator 42 is about 10 MHz. Therefore, an FM signal of 10 MHz, which was subjected to FM modulation by the video signal S1, is produced from the FM modulator 42. The FM signal is current-amplified by a recording amplifier 43. The amplified current is delivered to the primary windings 13a, 14a of the rotary transformers 13, 14. An FM signal induced in the secondary windings 13b, 14b of the rotary transformers 13, 14 is supplied to a magnetization winding 31a wound around the auxiliary magnetic pole 31 of the vertical recording heads 11, 12.

When the FM signal current is supplied to the winding 31a wound about the auxiliary magnetic pole 31, the resultant magnetic flux φ starts from the auxiliary magnetic pole 31, runs first through the recording layer 3c and then through the high permeability magnetic layer 3b, again passes through the recording layer 3c, and is finally collected at the main magnetic pole 33 (FIG. 3B). As a result, a residual magnetized field, which is perpendicularly inverted upon receipt of an FM signal, is produced in that portion of the recording layer 3c which lies close to the main magnetic pole 33. Thus, a video signal subjected to FM modulation by a video signal is efficiently recorded on a magnetic tape by means of vertical or perpendicular magnetization.

Description may now be made of the playback of the VTR. FM signals reproduced by the playback heads 21, 22 are supplied to a switcher 44 through the corresponding rotary transformers 23, 24. The reproduced FM signal supplied to the switcher 44 is a video signal containing information of a half rotation of the cylinder 2, since the video tape 3 is wound around the cylinders 1, 2 substantially at a circumferential angle of 180°. Consequently, respective playback outputs from the heads 21, 22 are intermittently and alternatively supplied to the switcher 44. The switcher 44 joins the intermittent and alternative playback outputs and sends forth a continuous playback signal. An output from the switcher 44 is voltage-amplified by a voltage amplifier 45. The amplified signal from the amplifier 45 is supplied to an FM demodulator 46. Then, a playback video signal S2 is obtained from an output terminal 47.

As described above, the video tape recorder embodying this invention enables a video signal to be recorded on and reproduced from a video tape provided with a perpendicular magnetization layer, without changing the main arrangement of the conventional VHS or β type VTR. With the subject VTR, the vertical recording heads 11, 12 and ring-shaped playback heads 21, 22 are mounted on that plane of the rotary cylinder 2 which faces the upper plane of the underlying stationary cylinder 1. Therefore, playback can be realized from the conventional planar recording type magnetic tape. The vertical recording heads 11, 12 of this invention can obviously allow for the playback of an FM signal recorded on the perpendicular magnetization recording layer 3c. However, the conventional head having a ring-shaped magnetic circuit, if applied as the playback heads 21, 22 of the subject VTR, also assures an efficient playback; not only from the perpendicular magnetization recording tape of the invention, but also from the conventional planar magnetization recording tape.

The principle by which a signal recorded on a perpendicular magnetization tape can be reproduced by a ring-shaped magnetic head is set forth in the Sept. 22, 1982 edition of "Electronics", pp. 131 to 135. Since the description given in said publication is incorporated by reference in the present patent application, the details thereof are omitted here.

Figure 5A:
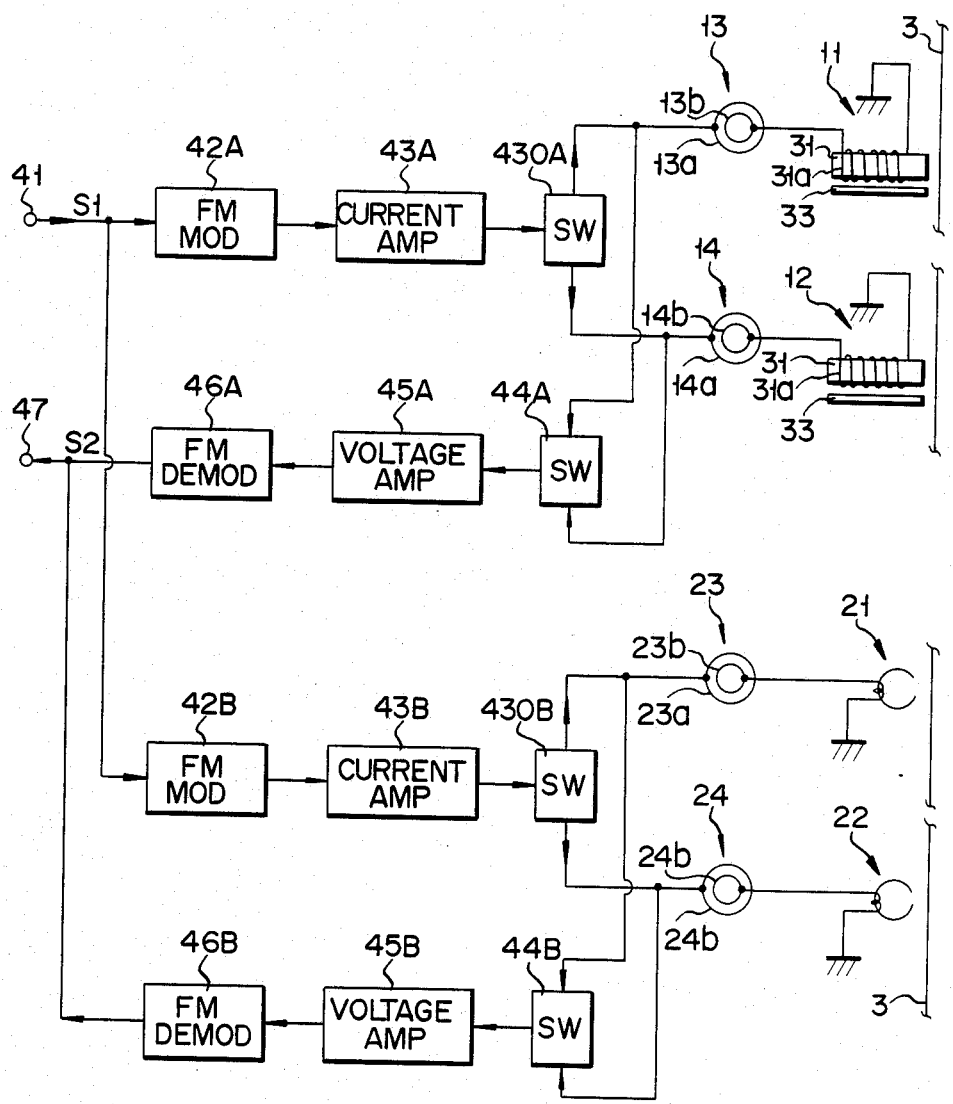
FIG. 5A shows a modification of FIG. 5.

FIG. 5A shows a modification of the configuration of FIG. 5. In FIG. 5A, a video signal S1 received at an input terminal 41 is supplied via an FM modulator 42A and a current amplifier (recording amplifier) 43A to a switcher 430A. The signal supplied to switcher 430A is alternatively transferred to either one of rotary transformers 13 and 14. Transformers 13 and 14 are respectively coupled to the coils 31a of vertical heads 11 and 12. Thus, video signal S1 is recorded, according to the vertical recording system, on a video tape 3 by means of two vertical heads 11 and 12.

Playback output from each of vertical heads 11 and 12 is supplied via rotary transformers 13 and 14 to a switcher 44A. Switcher 44A combines the respective outputs from vertical heads 11 and 12, and provides a continuous playback signal. This playback signal is amplified by a voltage amplifier 45A, and is FM-demodulated by an FM demodulator 46A. The demodulated output from FM demodulator 46A becomes a playback video signal S2. Playback video signal S2 is supplied to an output terminal 47.

Video signal S1 at terminal 41 is also supplied via an FM modulator 42B and a current amplifier 43B to a switcher 430B. The signal supplied to switcher 430B is alternatively transferred to either one of rotary transformers 23 and 24. Transformers 23 and 24 are respectively coupled to the windings of ring heads 21 and 22. Thus, video signal S1 is recorded, according to the planar recording system, on video tape 3 by means of two ring heads 21 and 22.

Playback output from each of ring heads 21 and 22 is supplied via rotary transformers 23 and 24 to a switcher 44B. Switcher 44B combines the respective outputs from ring heads 21 and 22, and provides a continuous playback signal. This playback signal is amplified by a voltage amplifier 45B, and is FM-demodulated by an FM demodulator 46B. The demodulated output from FM demodulator 46B becomes the playback video signal S2.

According to the configuration of FIG. 5A, the higher frequency part (short wave length) of video signal S1 is effectively recorded and played back by means of vertical heads 11 and 12, while the lower frequency part (long wave length) of video signal S1 is effectively recorded and played back by means of ring heads 21 and 22. If necessary, the signal transmission line through the elements 42A, 43A, 430A, 11–14, 44A, 45A and 46A may be provided with a high-pass filter for short wave length recording/playback, and/or the signal transmission line through the elements 42B, 43B, 430B, 21–24, 44B, 45B and 46B may be provided with a low-pass filter for long wave length recording/playback.

Figure 6A:
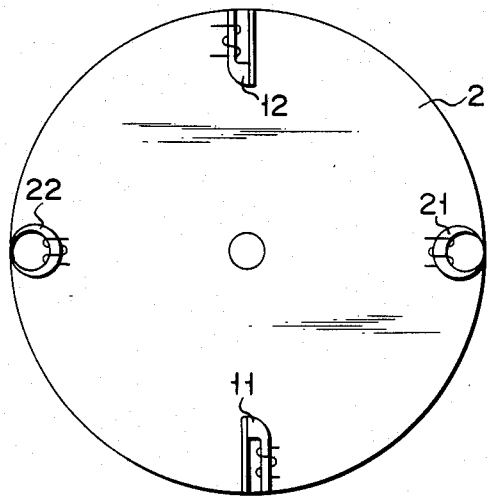
FIGS. 6A and 6B jointly represent a modification of FIG. 2A in which the head location is different from that in the case of FIG. 2A, thereby enabling a monitor playback of a video signal by the ring heads 21, 22, immediately after being recorded by the perpendicular magnetization heads 11, 12.
Figure 6B:
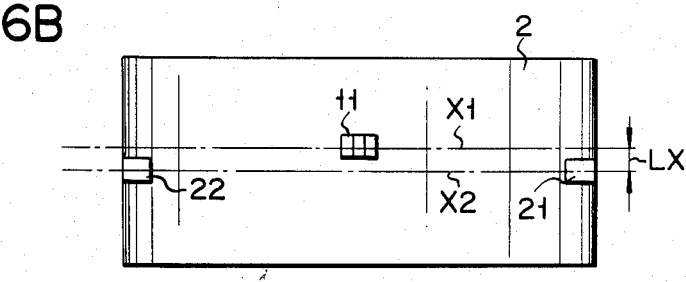
Figure 7:
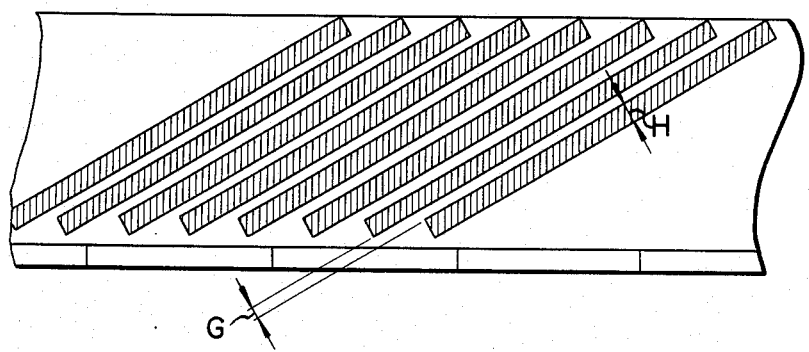
FIG. 7 illustrates the recording track pattern formed on a magnetic tape, in which data is recorded by the rotary heads of FIGS. 6A and 6B.

FIGS. 6A and 6B show a modification of the recording and playback heads of FIG. 2A. In FIG. 2A, the vertical recording heads 11, 12 have the same rotational locus as the playback ring heads 21, 22. Therefore, the tape track on which data was recorded by the heads 11, 12 cannot be traced by the heads 21, 22 immediately afterward. In other words, post-monitoring is impossible. Thus, to resolve the above-mentioned problem, the rotational locus X1 of the recording head 11 (12) is displaced from the rotational locus X2 of the playback head 21 (22) by a distance of LX. Let us now assume that, as shown in FIG. 7, H represents the width of a recording track, G denotes the width of a guard band, and the recording heads 11, 12 are circumferentially spaced from the adjacent playback heads 21, 22, at an angle of 90°. Then, the above-mentioned distance LX at which both rotational loci are displaced from each other may be represented by the following equation:

$$LX = \tfrac{1}{2}(G+H)$$

If the guard band is not provided (i.e., G=0), said distance LX will measure $\tfrac{1}{2}$H.

Figure 8:
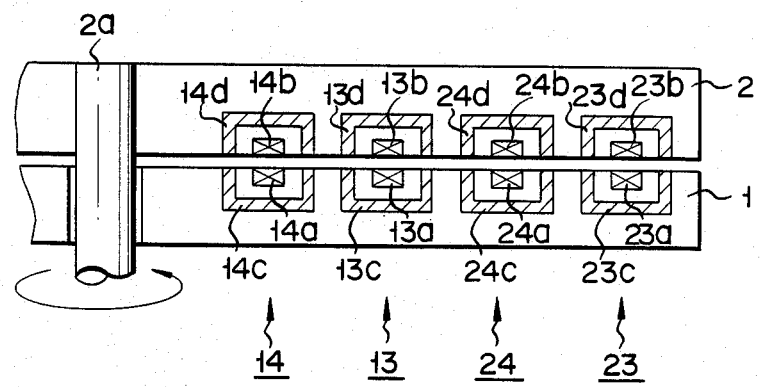
FIG. 8 is a sectional view of the rotary transformer used together with the rotary heads of FIGS. 6A and 6B.

FIG. 8 shows the arrangement of an assembly of rotary transformers 13, 14, 23, 24 which allow for post-monitoring and are used with the rotary heads indicated in FIGS. 6A and 6B. At the time of the post-monitoring, the primary coils 23a, 23b of the playback transformers undertake the detection of a playback signal, while the primary coils 13a, 14a of the recording transformers are releasing a magnetic flux corresponding to a recording signal. Therefore, unless electromagnetic coupling is shut off between the coils 13a, 14a and the coils 23a, 24a, interference arises between a recording signal and a playback signal. To avoid said interference, the coils 13a, 13b, 14a, 14b, 23a, 23b, 24a, 24b are all fully surrounded by the corresponding ring-like shields 13c, 13d, 14c, 14d, 23c, 23d, 24c, 24d, each of which has a U-shaped cross section. The respective shields can be manufactured from, e.g., a Permalloy plate, by press work. To fully effect static shielding at the same time, it is advisable to manufacture the respective shields from a lamination composed of a copper plate and Permalloy plate. In the rotary transformer of FIG. 8, the electromagnetic coupling between playback rotary transformers 23 and 24, as well as between recording rotary transformers 13 and 14, are also shielded in the above-mentioned manner.

FIGS. 9A, 9B and 9C jointly illustrate the arrangement of a playback head 21 (or 22) particularly adapted for the vertical magnetization recording system. The illustrated arrangement of the playback head involves the vertically arranged front transducing gap of the magnetic circuit members of the ordinary ring head. Specifically, the left surface 90L of a transducing gap coming into contact with the magnetic plane of the video tape 3 is magnetically coupled to a second magnetic circuit member 94 formed of, e.g., a hot-press ferrite block, through a first magnetic circuit emmber 92 prepared from said ferrite block (FIG. 9A). One end portion of the second magnetic circuit 94 constitutes the right end surface 90R of the transducing gap. A coil 310a used for electricity-magnetism conversion is wound around the superposed portions of the first and second magnetic circuit members 92, 94 (though said coil 310a may also be wound around the first magnetic circuit member 92 alone). The left and right end surfaces 90L, 90R jointly constitute the transducing gap of the aforesaid playback head 21 (or 22). The transducing gap comes into contact with the magnetic layer 3c provided on the video tape 3 (FIG. 9B). In this case, the width Wg of the transducing gap is defined by the distance between the parallel vertically arranged left and right end surfaces 90L, 90R (FIG. 9C). A magnetic flux released from the magnetic tape 3 penetrates, e.g., the left end surface 90L, runs through the magnetic circuit members 92, 94, and finally returns to the magnetic tape 3, after being drawn off of the right end surface 90R.

The perpendicular magnetization recording-playback ring head shown in FIGS. 9A, 9B and 9C has the advantage that, even when the transducing gap width Wg is reduced to the order of submicrons to elevate the playback resolution power, the magnetic reluctance between the end surfaces 90L, 90R can be prominently increased, thereby substantially decreasing the playback magnetic flux component which is short-circuited in the transducing gap. Even in the case wherein Wg≈0, the greater part of the magnetic flux released from the tape 3 penetrates the magnetic circuit members 92, 94 and coil 310a. Thus, even if the transducing gap has its width reduced, an efficient playback head can be obtained.

The perpendicular magnetization recording-playback ring head of FIGS. 9A, 9B and 9C has an arrangement modified from that of the magnetic head set forth in U.S. Pat. No. 4,369,477 (issued Jan. 18, 1983). The entire disclosure of said U.S. patent is incorporated by reference within this patent application.

FIGS. 10A and 10B jointly show the arrangement of a video tape recorder wherein the auxiliary magnetic head of the perpendicular magnetization recording head is made non-rotatable. In this case, the vertical recording head fitted to the rotary cylinder 2 only comprises main magnetic poles 110, 120. These main magnetic poles 110, 120 are respectively wound with exciting coils 112, 122 for magnetic-flux-generating. After the video tape 3 is helically wound around the rotary cylinder 2, a little beyond the extent of a semi-circle, a magnetic wall 100 bent into a semicircular shape is brought against the outer peripheral wall of the rotary cylinder 2, thereby causing the video tape 3 to be interposed between the magnetic wall 100 and the rotary cylinder 2. The magnetic wall 100 is formed of a high permeability magnetic band prepared from, e.g., Permalloy, Sendust, or a ferromagnetic amorphous alloy. That portion of said magnetic wall 100 which faces main magnetic pole 110 or 120 acts as an auxiliary magnetic pole. When excited by, e.g., the coil 122 of FIG. 10A, the main magnetic pole 120 releases a recording magnetic flux toward that portion of the magnetic wall 100 which faces said excited main magnetic pole 120. Said magnetic flux perpendicularly penetrates the perpendicular magnetization layer (corresponding to layer 3a of FIG. 3B) of the video tape 3, to be absorbed by the magnetic wall 100. As a result, perpendicular magnetic recording can be efficiently carried out without applying a rotary auxiliary magnetic pole.

Further, with the arrangement of FIG. 10A, the video tape 3 need not be provided with a magnetic layer 3b having the axis of easy planar magnetization shown in FIG. 3B.

It will be noted that this invention is not limited to the foregoing embodiments; and that, for example, the recording heads and playback heads need not be provided in two, but may be provided in any optional numbers. Further, it is possible to omit the guard band G shown in FIG. 7, and suppress signal crosstalk between the adjacent tracks, via the so-called azimuth recording system. The azimuth recording system has already been set forth in, e.g., Japanese Utility Model Publication No. 23,924/64. The contents of this publication are incorporated by reference within the present application. The ring heads 21, 22 need not be used exclusively for playback; but, as occasion demands, may be applied as recording heads in the planar recording process. In any event, the ring heads 21, 22 can be put to three uses, i.e., the playback of the vertical magnetization recording system, and the playback and recording of the planar magnetization recording system. Further, this invention allows for so-called 2-way recording, which comprises the steps of recording the shorter wavelength components of a video signal by the vertical magnetization recording heads 11, 12, as well as recording the longer wavelength components of the video signal, by the ring heads 21, 22. Such an arrangement realizes efficient video recording over a wide frequency range extending from the longer wavelength range to the shorter wavelength range. In addition, this invention is obviously applicable with various changes and modifications, without departing from its scope and object.

As mentioned above, the video tape recorder embodying this invention is characterized in that a plurality of vertical recording magnetic heads and a plurality of ring heads are jointly mounted on the rotary cylinder; a vertical magnetization video tape is helically wound around the rotary cylinder; at the time of recording, a video signal may be recorded by said vertical recording magnetic heads; and, at the time of playback, a video signal may be reproduced by the ring head; thereby providing a video tape recorder which enables a video signal to be efficiently recorded on and reproduced from a video tape, by means of the helical scanning process. The ring head used with the video tape recorder of this invention is also applicable to the playback of a video signal from a video tape on which information is recorded via a conventional planar magnetization recording system. The subject video tape recorder enables data to be reproduced from video tape on which data has been recorded by a vertical magnetization recording system, or from tape of the conventional video tape recorder. In other words, the video tape recorder of this invention has good compatibility with the conventional type.

What is claimed is:

1. A rotary head type video tape recorder, which comprises:
   a rotary cylinder arranged for slidable contact, at a portion of the peripheral wall of said cylinder, with a video tape having a recording magnetic layer defining a magnetic plane; and
   at least one vertical magnetization recording head mounted on said rotary cylinder in the vicinity of said peripheral wall;
   wherein said vertical magnetization recording head includes a portion which comprises a main magnetic pole and an auxiliary magnetic pole each disposed to face the magnetic plane of said video tape, so that at least part of the recording magnetic flux passing between said main magnetic pole and said auxiliary magnetic pole passes through the recording magnetic layer of the video tape substantially perpendicularly;
   wherein the peripheral wall of the rotary cylinder is provided with at least one playback head the location of which is displaced a given angle from the location of said vertical magnetization recording head with respect to the rotational center of said rotary cylinder; and
   wherein the playback head includes a first magnetic circuit member having a first vertical end surface and a second magnetic circuit member a part of which is superposed on a part of said first magnetic circuit member and having a second vertical end surface parallel to and facing in the direction of said first end surface, wherein said end surfaces are offset from one another and the distance between the planes of said end surfaces defines a transducing gap at a position facing the magnetic plane of the video tape so that magnetic flux released from said tape is absorbed by one of said end surfaces to be conducted by both said magnetic circuit members and returned to the tape from the other one of said end surfaces, and a ring-shaped magnetic circuit formed in part by said first and said second magnetic circuit members;
   means to convert between magnetism and electricity in winding coupling relation with said ring-shaped magnetic circuit; and
   control means for activating said vertical magnetization head to record on said video tape the shorter wavelength component of a signal to be recorded, for activating said playback head to record on said video tape the longer wavelength component of said signal to be recorded, and for activating said playback head to play back from said video tape both said shorter and longer wavelength components of said signal.

2. A video tape recorder according to claim 1, wherein said video tape comprises:
   a base film;
   a first magnetic layer formed on said base film, said first magnetic layer having an axis of easy magnetization in a direction along which said recording magnetic flux flows parallel to the plane of said base film;
   a second magnetic layer formed on said first magnetic layer, said second magnetic layer having an axis of easy magnetization in a direction along which said recording magnetic flux flows perpendicular to the plane of said base film.

3. A video tape recorder according to claim 1, wherein said playback head is provided with said magnetism-electricity conversion means.

4. A video tape recorder according to claim 1, wherein said rotary cylinder is provided with two vertical magnetization recording heads spaced apart from each other at a circumferential angle of about 180°; and with two playback heads which are spaced apart from each other at a circumferential angle of about 180°, being respectively set apart from the corresponding vertical magnetization recording heads at a circumferential angle of about 90°.

5. A video tape recorder according to claim 4, wherein the rotary cylinder is provided with recording rotary transformers respectively connected to said vertical magnetization recording heads, and with playback rotary transformers respectively connected to said playback heads; the recording rotary transformers being electromagnetically shielded from the playback rotary transformers.

6. A video tape recorder according to claim 4, wherein said vertical magnetization recording heads are exclusively used for vertical magnetization recording; said playback heads are applied to the playback of a video signal from the video tape on which recording is effected, by the vertical magnetization recording system or planar magnetization recording system.

7. A video tape recorder according to claim 6, wherein the rotary cylinder is provided with recording rotary transformers respectively connected to said vertical magnetization recording heads, and with playback rotary transformers respectively connected to said playback heads; the recording rotary transformers being electromagnetically shielded from the playback rotary transformers.

8. A video tape recorder according to claim 1, wherein the rotary cylinder is provided with recording rotary transformers respectively connected to said vertical magnetization recording heads, and with playback rotary transformers respectively connected to said playback heads; the recording rotary transformers being electromagnetically shielded from the playback rotary transformers.

9. A video tape recorder according to claim 1, wherein said vertical magnetization recording head is provided for use in recording and playback of a vertical recording system, and said playback head is provided for use in recording and playback of a planar recording system.

10. A video tape recorder according to claim 1, wherein the rotary cylinder is provided with recording rotary transformers respectively connected to said vertical magnetization recording heads, and with playback rotary transformers respectively connected to said playback heads; the recording rotary transformers being electromagnetically shielded from the playback rotary transformers.

11. A rotary head type video tape recorder, which comprises:
a rotary cylinder arranged for slidable contact, at a portion of the peripheral wall of said cylinder, with a video tape having a recording magnetic layer defining a magnetic plane; and
at least one vertical magnetization recording head mounted on said rotary cylinder in the vicinity of said peripheral wall;
wherein said vertical magnetization recording head includes a portion which comprises a main magnetic pole and an auxiliary magnetic pole each disposed to face the magnetic plane of said video tape, so that at least part of the recording magnetic flux passing between said main magnetic pole and said auxiliary magnetic pole passes through the recording magnetic layer of the video tape substantially perpendicularly;
wherein the peripheral wall of the rotary cylinder is provided with at least one playback head the location of which is displaced a given angle from the location of said vertical magnetization recording head with respect to the rotational center of said rotary cylinder; and
wherein the vertical magnetization recording head helically scans the magnetic plane of the video tape wound around the rotary cylinder; and the rotational locus of the vertical magnetization recording head is displaced from the rotational locus of the playback head at a distance corresponding to the distance between adjacent recording tracks formed on the video tape by a helical scanning operation, so that immediate post-monitoring of recorded data can be obtained via the playback head; and
control means for activating said vertical magnetization head to record on said video tape the shorter wavelength component of a signal to be recorded, for activating said playback head to record on said video tape the longer wavelength component of said signal to be recorded, and for activating said playback head to play back from said video tape both said shorter and longer wavelength components of said signal.

12. A video tape recorder according to claim 11, wherein said video tape comprises:
a base film;
a first magnetic layer formed on said base film, said first magnetic layer having an axis of easy magnetization in a direction along which said recording magnetic flux flows parallel to the plane of said base film;
a second magnetic layer formed on said first magnetic layer, said second magnetic layer having an axis of easy magnetization in a direction along which said recording magnetic flux flows perpendicular to the plane of said base film.

13. A video tape recorder according to claim 11, wherein said playback head is provided with said magnetism-electricity conversion means; said vertical magnetization recording head is applied in recording the shorter wavelength component of a signal to be recorded; and said playback head is used to record the longer wavelength component of said signal to be recorded.

14. A video tape recorder according to claim 11, wherein said rotary cylinder is provided with two vertical magnetization recording heads spaced apart from each other at a circumferential angle of about 180°; and with two playback heads which are spaced apart from each other at a circumferential angle of about 180°, being respectively set apart from the corresponding vertical magnetization recording heads at a circumferential angle of about 90°.

15. A video tape recorder according to claim 14, wherein said vertical magnetization recording heads are exclusively used for vertical magnetization recording; said playback heads are applied to the playback of a video signal from the video tape on which recording is effected, by the vertical magnetization recording system or planar magnetization recording system.

16. A video tape recorder according to claim 11, wherein the rotary cylinder is provided with recording rotary transformers respectively connected to said vertical magnetization recording heads, and with playback rotary transformers respectively connected to said playback heads; the recording rotary transformers being electromagnetically shielded from the playback rotary transformers.

* * * * *